United States Patent [19]

Sato

[11] Patent Number: 4,467,375
[45] Date of Patent: Aug. 21, 1984

[54] MUSIC RESERVATION DEVICE FOR USE WITH MAGNETIC TAPE PLAYBACK APPARATUS

[75] Inventor: Takashi Sato, Kawagoe, Japan
[73] Assignee: Pioneer Electronic Corporation, Kawagoe, Japan
[21] Appl. No.: 288,151
[22] Filed: Jul. 29, 1981
[30] Foreign Application Priority Data
  Jul. 31, 1980 [JP] Japan .................. 55-105383
[51] Int. Cl.³ .................................. G11B 15/18
[52] U.S. Cl. ........................ 360/72.1; 360/74.1
[58] Field of Search ...................... 360/71–74, 360/72.1, 72.3, 73, 74.1, 74.2, 74.3, 74.4, 69, 72.2

[56] References Cited

U.S. PATENT DOCUMENTS

| | | | |
|---|---|---|---|
| 3,609,251 | 9/1971 | Ban | 360/72.1 |
| 3,893,177 | 7/1975 | Takenaka | 360/72.1 |
| 4,225,890 | 9/1980 | Takenaka et al. | 360/71 X |
| 4,237,497 | 12/1980 | Trevithick | 360/71 X |
| 4,301,482 | 11/1981 | Trevithick | 360/72.1 |
| 4,315,286 | 2/1982 | Copeland | 360/72.1 X |
| 4,342,056 | 7/1982 | Ishii et al. | 360/72.1 |

Primary Examiner—Aristotelis M. Psitos
Assistant Examiner—K. Wong
Attorney, Agent, or Firm—Fleit, Jacobson, Cohn & Price

[57] ABSTRACT

A music reservation device which stores a music number of a first piece of music now being played back as well as a music number of a second piece of music which is reserved and to be played just after completion of playback of the first piece of music. Upon completion of the playback operation for the first piece of music, the music reservation device compares both the stored music number of the first and second pieces of music and indicate FF or REW mode operation until the stored music number of the first and second pieces of music coincide with each other. When the both music number coincides with each other the device indicates PLAY mode or STOP operation.

7 Claims, 4 Drawing Figures

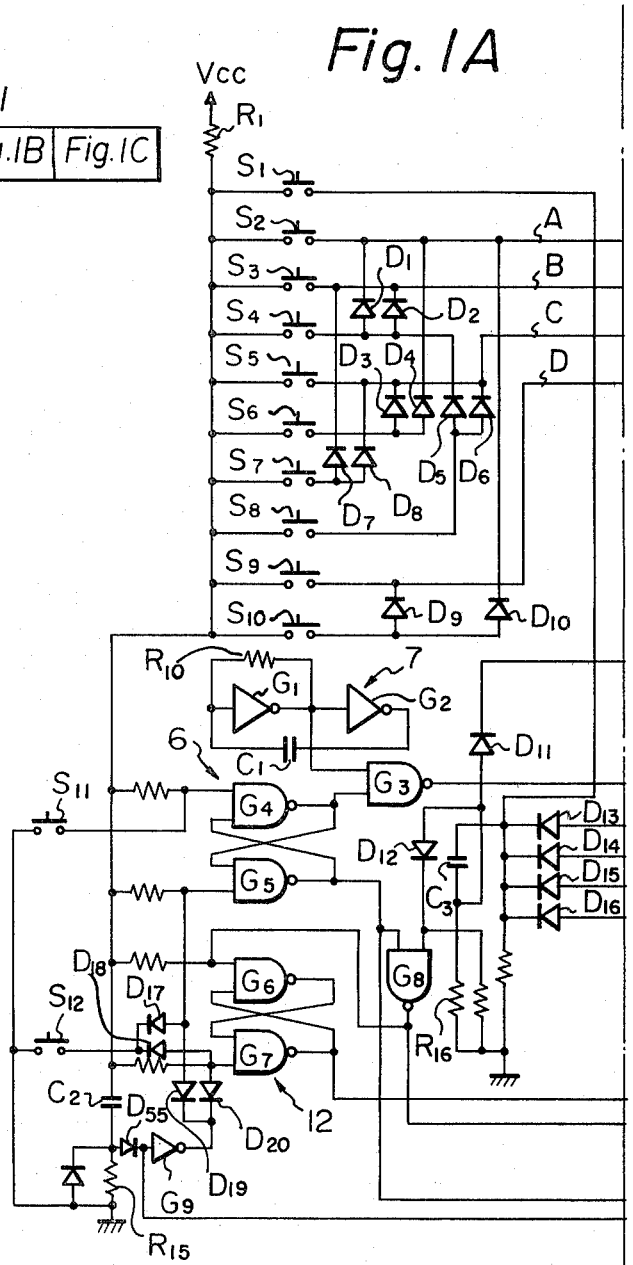

MUSIC RESERVATION DEVICE FOR USE WITH MAGNETIC TAPE PLAYBACK APPARATUS

FIELD OF THE INVENTION

The present invention relates in general to a magnetic tape recorder and in particular to a music reservation device to be used for the magnetic tape recorder.

BACKGROUND OF THE INVENTION

In a magnetic tape sound recording and reproducing system, it is usual that many packages of information are recorded successively in one real or cassette of magnetic tape. One package of information recorded may be a piece of music or the like. Thus, one package of information recorded in a magnetic tape is referred to as merely a "music" in this specification.

When various many musics are recorded in one magnetic tape and all or some of them are to be played back at random or without respect to the order of the recorded position of those musics, forward and/or reverse advancement of the magnetic tape should be repeated so as to find out a desired music to be reproduced before starting play-back operation.

It may therefore be much desirable to avoid such repeated tedious forward and/or reverse operations for finding out a desired music.

It is accordingly a primary object of the present invention to provide a music reservation device for use with a magnetic tape sound play-back apparatus, which device can reserve a music for the succeeding reproduction during play-back operation of another music and automatically find out the reserved music just after the end of the previous play-back operation.

It is another object of the present invention to provide a music reservation device which can be readily realized by use with integrated circuits.

SUMMARY OF THE INVENTION

In accordance with the present invention, there is provided a music reservation device to be used in a magnetic tape play-back apparatus which is adapted to play back a magnetic tape set therein via a play-back head thereof when a play back mode indicated and to advance either forwardly or reversely the magnetic tape in response to either forward or rewind indication signal, which device comprises: music number signal producing means for producing a music number signal representing a number of one piece of music recorded on a magnetic tape, when manually operated; storing means for storing the latest one of the music number signals delivered from said music number signal producing means; a presettable up-down counter which is pre-set at a count corresponding to one of said music number signal applied thereto as long as it is allowed to be pre-set; reservation command means adapted to operate to prohibit the preset operation of said presettable up-down counter, when manually actuated; comparing means for comparing the music number stored in said storing means with the count of said presettable up-down counter and for producing a first signal when the former is larger than the latter, a second signal when the former is smaller than the latter and a third signal when the former and the latter are equal to each other; music intermission pulse generator for generating a music intermission pulse when the playback head of the apparatus enters an intermission zone of the magnetic tape; forward advancement control means for producing the forward command signal in response to the initial music intermission pulse during when the first signal lasts and for supplying the music intermission pulses as up-count pulses to the presettable up-down counter during when the first signal lasts; reverse advancement control means for producing the rewind command signal in response to the initial music intermission pulse during when the second signal lasts and for supplying music intermission pulses other than the first two thereof as down-count pulses to the presettable up-down counter during when the second signal lasts; play-back control means for producing the playback command signal in response to the third signal.

BRIEF DESCRIPTION OF THE DRAWINGS

The features and advantages of a music reservation device according to the present invention will be more clearly understood from the following description taken in conjunction with the accompanying drawings, consisting of FIGS. 1A through 1C, which show an overall circuit arrangement of the music reservation device according to the present invention.

DETAILED DESCRIPTION OF EMBODIMENT

Figure 1B:
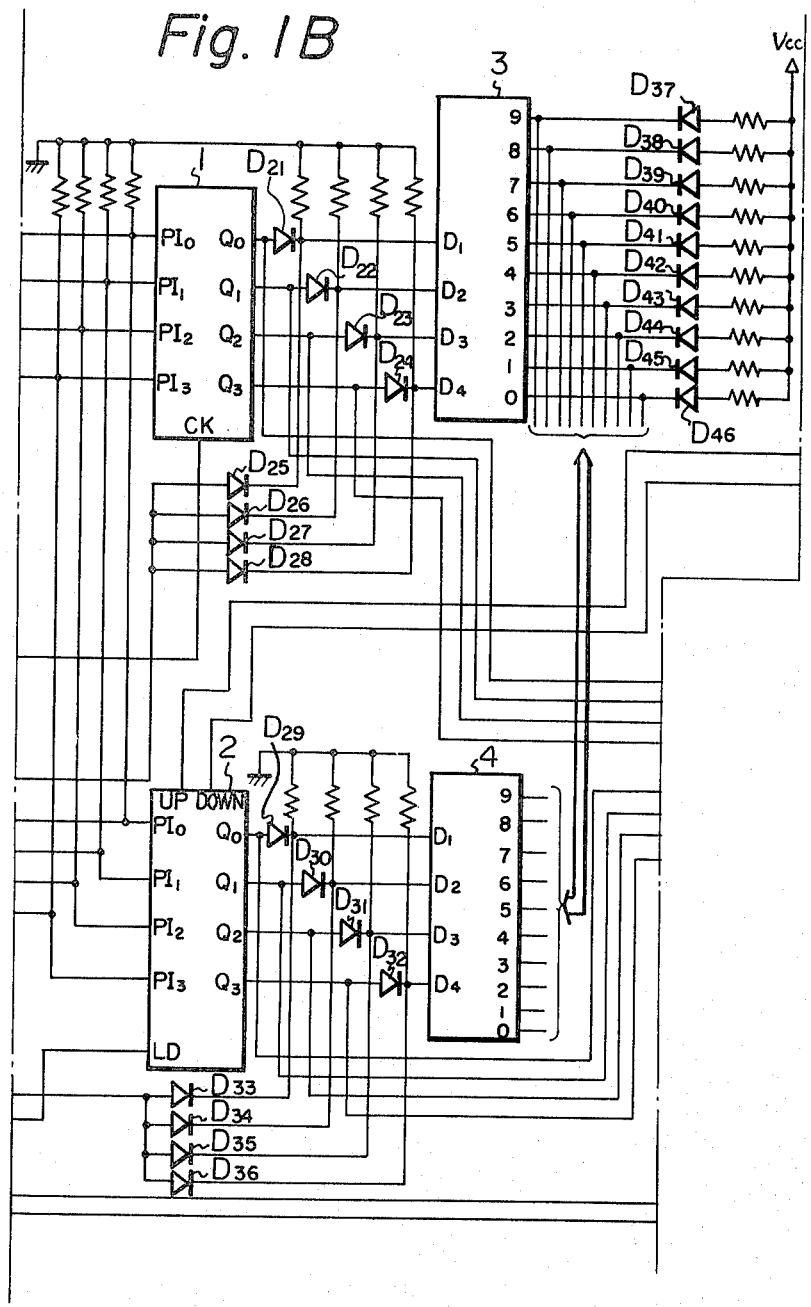
Figure 1C:
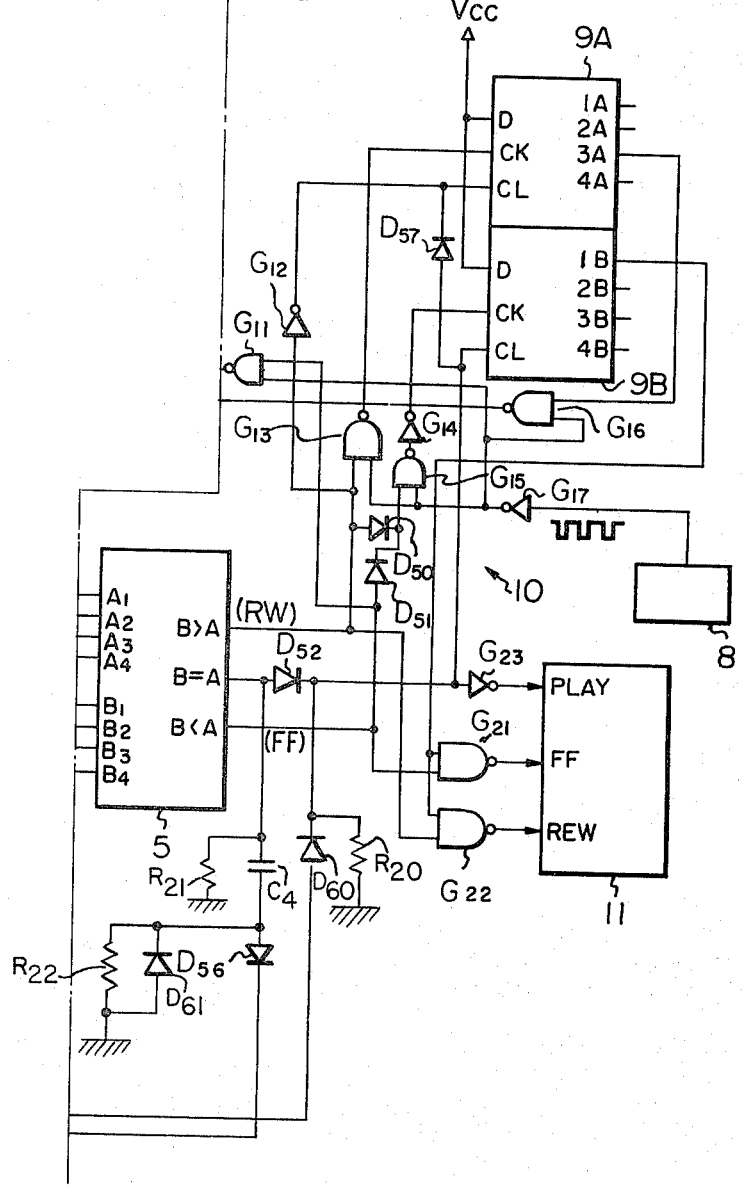

Referring now to the drawing, there is shown a music reservation device according to the present invention which is to be used in a magnetic tape playback apparatus. The music reservation device comprises a manually-operable and normally open music number command switches $S_1$ through $S_{10}$ respectively corresponding to the number of the musics recorded in a magnetic tape set in the magnetic tape playback apparatus. Even through the number of the music number command switches is, in this embodiment, ten (10), it is not to be limited to ten. Diodes $D_1$ through $D_{10}$ are connected between the switches $S_1$ through $S_{10}$ and output lines A, B, C and D so that these diodes constitute an encoder for supplying four-bits of binary digital signal corresponding to one of the switches which is actuated to the output lines A through D. When, for example, the music number command switch $S_7$ is manually actuated, diodes $D_7$ and $D_8$ become "ON" so that output lines B and C take a high potential. Accordingly, the four bit binary output signal appearing on the lines A through D is (0, 1, 1, 0) corresponds to a decimal figure "6". When the switch $S_1$ is actuated, the four bit binary output signal becomes (0, 0, 0, 0) which corresponds to decimal figure "0". Namely, the switches $S_1$ through $S_{10}$ respectively correspond decimal figures "0" through "9" and accordingly, the switches $S_1$ through $S_{10}$ correspond to music numbers "1" through "10".

The four bit binary output signal appearing on the lines A through D is applied to bit input terminals of a four bit memory 1 and a presettable up-down counter 2. The four bit memory 1 is adapted to read-in the input binary signal when its clock input terminal CK is subjected to a high level potential. The presettable up-down counter 2 is adapted to read-in the input binary signal when its load input terminal LD is subjected to a low level potential.

The memory 1 produces four bit output signal on its output terminal $Q_0$ through $Q_3$ which is supplied through diodes $D_{21}$ through $D_{24}$ to input terminals $D_1$ through $D_4$ of a decoder 3. The decoder 3 is adapted to convert the input binary signal into a decimal signal which is represented by a low level potential appearing on one of the ten number of output terminals of the decoder 3. To these ten number of output terminals of the decoder 3 are connected ten number of photo diodes $D_{37}$ through $D_{46}$ which are in turn connected through resistors to a voltage source Vcc. Output terminals $Q_0$ through $Q_3$ of the up-down counter 2 are connected through diodes $D_{29}$ through $D_{32}$ to input terminal $D_1$ through $D_4$ of a decoder 4 which has the same construction as the decoder 4. The decoder 3 has ten number of output terminals which are respectively connected to the photo diodes $D_{37}$ through $D_{45}$.

A four bit digital comparator 5 compares both contents of the memory 1 and the up-down counter 2 which are respectively applied thereto through input terminals $A_1$ through $A_4$ and $B_1$ through $B_4$. The comparator 5 produces a first signal on its output terminal "B<A" when the content of the memory 1 is larger than that of the up-down counter 2. When, on the contrary, the content of the memory 1 is smaller than that of the memory 2 the comparator 5 produces a second signal on its output terminal "B>A" terminal. When both the contents of the memory 1 and the counter 2 are equal to each other the comparator 5 produces a third signal on its output terminal "A=B". The first, second and third signal are all high level potential signal and correspond to fast forward (FF), rewind (REW) and play (PLAY) modes of operation of the magnetic tape playback apparatus.

A reservation command switch $S_{11}$ is to be manually actuated when it is intended to reserve a desired music to be played back succeedingly to a music which is now reproduced. When the reservation command switch $S_{11}$ is operated, an R-S flip flop circuit 6 constituted by NAND gates $G_4$ and $G_5$ is set which then produces a low level signal on the output terminal of the NAND gate $G_5$. Under this condition, a NAND gate $G_8$ produces a high level signal without respect to another input signal applied thereto, so that the load terminal LD of the counter 2 is subjected to a high level whereby the counter 2 is never preset without respect to input signal to the input terminals $PI_0$ through $PI_3$. When, under this condition, one of the music command switches $S_1$ through $S_{10}$ is actuated, only the memory 1 read-in the four bit binary signal appearing on the lines A through D which corresponds to the selected or reserved music number. Since, on the other hand, the NAND gate $G_4$ produces a low level signal which is supplied to one input of a NAND gate $G_3$, the NAND gate $G_3$ passes therethrough oscillatory output signal from an oscillator 7 constituted by NAND gates $G_1$ and $G_2$, a resistor $R_{10}$ and a capacitor $C_1$. The oscillatory output signal from the oscillator 7 has a frequency of about 1 Hz. The oscillatory output signal passed through the gate $G_3$ is supplied through diodes $D_{25}$ through $D_{28}$ to the input terminals of the decoder 3 so that the output binary signal from the output terminals of the memory 1 is intermittently blocked at the frequency of about 1 Hz by means of gate means constituted by those diodes $D_{21}$ through $D_{28}$, whereby one of the photo-diodes $D_{37}$ through $D_{46}$ is energized by the output signal from the decoder intermittently at a period of about one second.

A music intermission detector 8 is provided which produces a music intermission pulse even when the playback head of the playback apparatus enters an intermission zone between musics recorded on the magnetic tape. The music intermission pulse train is supplied through an inverter $G_{17}$ to NAND gates $G_{13}$, $G_{15}$ and $G_{16}$ of FF/REW command signal generating logic circuit 10. The FF/REW command signal generating logic circuit 10 further includes NAND gates $G_{21}$, $G_{22}$, inverters $G_{12}$, $G_{14}$, diodes $D_{50}$ through $D_{52}$, and four bit shift registers 9A, 9B. To data input terminals D of both the shift register 9A and 9B is supplied with a high level potential from the voltage source Vcc. If the comparator 5 produces the first signal, which is preparatory for FF indication, the gate $G_{11}$ passes therethrough the music intermission pulse train from the inverter $G_{17}$ to the up-down counter 2 as up-count pulses. At the same time, the gate $G_{21}$ can pass therethrough an output signal from the shift register 9B to a mechanism drive circuit 11 as an FF command signal.

As long as, on the other hand, the comparator 5 produces the second signal, which is preparatory for REW indication, the gate $G_{13}$ passes therethrough the music intermission pulse train to a clock input terminal CK of the shift registor 9A which produces an output signal from its output terminal 3A in response to the third music intermission pulse. Due to the output signal from the shift registor 9A, the NAND gate $G_{16}$ passes therethrough the music intermission pulse train as down-count pulse to the counter 2. Since, at this instance, the gate $G_{22}$ receives the second signal from the comparator 5, the gate $G_{22}$ passes therethrough the output signal from the shift registor 9B to the mechanism drive circuit 11 as a rewind indication signal.

When the compartor 5 produces the third signal, which is preparatory for PLAY indication, the third signal is supplied through a diode $D_{52}$ to a clear terminal CL of the shift registor 9B which is cleared so that the gates $G_{21}$ and $G_{22}$ block any signal to pass therethrough to the mechanism drive circuit 11. At the same time, the third signal is supplied through a differentiator constituted by a capacitor $C_4$, resistors $R_{21}$, $R_{22}$ and a diode $D_{61}$, and a diode $D_{56}$ to an inverter $G_9$ which then resets the flip-flop circuit 6 as well as a flip-flop circuit 12 constituted by NAND gates $G_6$ and $G_7$ by way of diodes $D_{19}$ and $D_{20}$.

A release switch $S_{12}$ is normally open and to be manually operated when it is intended to release the music reservation operation of the device. When the release switch $S_{12}$ is actuated, the flip-flop circuit 6 is reset by way of a diode $D_{17}$ and the flip-flop circuit 12 is reset by way of a diode $D_{18}$ and, furthermore, the input terminal $D_1$ through $D_4$ of the decoder 4 are subjected to a high level potential by way of diodes $D_{33}$ through $D_{35}$ thereby to de-energize all the photo-diodes $D_{37}$ through $D_{46}$.

The operation of the circuit arrangement mentioned above will be explained hereinbelow.

When, in operation, the voltage source Vcc is thrown in, a capacitor $C_2$ is charged up through resistors $R_1$ and $R_{15}$. Until the voltage across the capacitor $C_2$ reaches a predetermined level, a so-called power-on reset operation is performed. Before the voltage across the capacitor $C_2$ reaches the predetermined level, the inventor $G_9$ produces a low level signal, so that both the flip-flop circuits 6 and 12 are reset whereby gates $G_5$ and $G_7$ produce high level signals, respectively. On the other hand, the gate $G_4$ produces a low level signal which causes the gate $G_3$ to block the oscillatory output signal from the oscillator 7. Accordingly, the high level signal from the gate $G_3$ is supplied through diodes $D_{25}$ through $D_{28}$ to all the input terminals of the decoder 3. Since the decoder 3 is adapted to raise all the output terminals thereof at the high level in response to input binary signals corresponding to decimal FIGS. 10 through 15, the output terminal of the decoder 3 are maintained at the high level when all the input terminals are subjected to the high level, whereby the photodiodes $D_{37}$ through $D_{46}$ are all de-energized.

Since the flip-flop circuit 6 is reset, the gate $G_5$ supplies the high level signal to one input terminal of the gate $G_8$ which then prepares to pass therethrough a read-in pulse to the loading terminal LD of the counter 2. The high level signal from the gate $G_5$ is also applied through a reverse current blocking diode $D_{60}$ to the clear terminal CL of the shift registor 9B which is then cleared. Since the flip-flop circuit 12 is reset, the gate $G_7$ produces the high level signal which is supplied through the diodes $D_{33}$ through $D_{36}$ to the input terminals of the decoder 4. The decoder 4 then produces the high level signal on all its output terminals.

After the above-mentioned power-on operation of the device, one of the music command switches $S_1$ through $S_{10}$ is to be actuated during play mode operation of the apparatus so as to initiate the music reservation operation of the device. In this instance, it is to be understood that the actuated music command switch should correspond to a music number of a "music" now being played back. Due to the actuation of one of the music command switches $S_1$ through $S_{10}$, the capacitor $C_3$ is charged up so that a high level pulse appears across the resistor $R_{16}$. This high level pulse is applied through the diode $D_{12}$ to the other input terminal of the gate $G_8$ which then produces the low level signal. The low level signal from the gate $G_8$ is applied to the loading input terminal LD of the counter 2 which is then preset at a binary count corresponding to the music number indicated by the actuated music command switch. The low level signal from the gate $G_8$ is further applied to the input terminal of the flip-flop circuit 12 which is then set so that the gate $G_7$ produces the low level signal. The low level signal from the gate $G_7$ causes the diodes $D_{33}$ through $D_{36}$ become OFF so that the preset data in the counter 2 is applied through the diodes $D_{29}$ through $D_{32}$ to the input terminals of the decoder 4. The decoder 4 produces the low level signal on one of its output terminals so that one of the diodes $D_{37}$ through $D_{46}$ glow to display or indicate the music number of the music now being played back.

When it is assumed that a piece of music of No. 7 is being played back, the music command switch $S_7$ is manually operated, so that a binary code signal (0, 1, 1, 0) appears on the lines A through D which is loaded on the counter 2. The counter 2 produces the binary signal (0, 1, 1, 0) at its output terminals which is then decoded into a decimal code signal and produces the low level signal on the output terminal No. 6 whereby only the photo diode $D_{40}$ glows to indicate the music number No. 7.

Even when one of the music command switch is erroneously actuated and incorrect music number is command by the photo diodes, correct music indication switch can be immediately actuated so that the counter 2 is again preset at another count corresponding to the correct music number.

When, thereafter, the reservation command switch $S_{11}$ is manually actuated, the flip-flop 6 is set so that the gate $G_5$ produces the low level signal which causes the gate $G_8$ not to produce the read-in pulse, whereby the counter 2 will not be preset while the flip-flop circuit 6 is set. The low level signal from the gate $G_5$ is further supplied to the clear terminal CL of the shift registor 9B which then becomes responsive to shift pulses applied to its clock input terminal CK. Since, in this instance, the gate $G_4$ produces the high level signal, the gate $G_3$ passes therethrough the oscillatory output signal from the oscillatory 7 which is then supplied through the diodes $D_{25}$ through $D_{28}$ to the input terminals of the decoder 3.

In this instance, it is to be understood that the memory 1 stores the music number of the music now being played back which is also stored in the counter 2. In the above-mentioned example, the stored music number is No. 7, so that the decoders 3 and 4 both produce the low level signal on their seventh output terminals and the high level signal on other output terminals, whereby only the diode $D_{40}$ still glow constantly even after the actuation of the reservation indication switch.

When, thereafter, one of the music command switches $S_1$ through $S_{10}$ is operated, the capacitor $C_3$ is charged up so that the high level signal is applied through the diode $D_{11}$ to the clock terminal CK of the memory 1 whereby the memory 1 reads-in a binary code signal from the lines A through D representing the actuated music command switch. When the switch $S_3$ is assumed to be actuated, the binary code signal (0, 0, 1, 0) is read-in by the memory 1. This binary code signal is delivered through the diodes $D_{21}$ through $D_{24}$ to the decoder 3. Since, in this instance, the oscillatory signal from the oscillator 7 is supplied through the diodes $D_{25}$ through $D_{28}$ to the input terminals of the decoder 3, the decoded signal produced from the decoder 3 is also oscillatory at about 1 Hz, with the result that the photo-diode $D_{44}$ glow periodically at the frequency of about 1 Hz. This periodic lighting of the photo-diode $D_{44}$ indicates that the No. 3 "music" has been reserved. On the other hand, the photo-diode $D_{40}$ constantly energized by the decoder 4 glows constantly to indicate that the No. 7 "music" is being played back.

When, as mentioned above, the music number of a music which is reserved is stored in the memory 1, the comparator 5 compares the content of the memory 1 with that of the counter 2. As already mentioned, the comparator 5 produces the first signal when the content of the memory 1 is larger than that of the counter 2. When, on the contrary, the countent of the memory 1 is smaller than that of the counter 2, the comparator 5 produces the second signal. When both the contents of the memory 1 and the counter 2 are equal to each other, the comparator 5 produces the third signal. The first, second and third signals respectively correspond to the fast forward (FF), rewind (REW) and play (PLAY) modes of the play-back apparatus. In the above-mentioned example, the content of the counter 2 is "7" and that of the memory 1 is "3", so that the comprator 5 produces the second signal on its "B>A" output terminal. The second signal, which is the high level signal, is supplied to the gates $G_{22}$ which then prepares to produce the REW mode indication signal. The second signal is further supplied to the gates $G_{13}$ and $G_{15}$ which then prepare to pass therethrough the music intermission pulses from the music intermission detector 8 to the clock input terminals CK of the shift registor 9A and 9B. When, accordingly, the music intermission detector 8 produces the music intermission pulse upon completion of the play-back of the "music", the shift registor 9A and 9B produce the high level signal on their output terminals 1A and 1B, respectively. The high level signal from the output terminal 1B of the shift registor 9B causes the gate $G_{22}$ to produce the REW mode indication signal of the low level which is supplied to the mechanism drive circuit 11 whereby the play-back apparatus starts to REW mode operation. During this REW mode operation, the music intermission pulses consecutively are produced from the music intermission detector 8 which triggers the shift registor 9A. When the output terminal 3A of the shift registor 9A produces the high level signal due to supply of the third music intermission pulse thereto, the gate $G_{16}$ is prepared to pass therethrough the music intermission pulses which are supplied to the counter 2 as the down-count pulses so that the counter 2 reduces its content from the initial state by the down-count pulses corresponding to the music intermission pulses.

The reason why the initial two music intermission pulses after start of the REW mode operation are not used as the down-count pulses is that the first music intermission corresponds to a "music" of a music number larger than the music number of the music just played back by "1" and the second music intermission pulse correspond to the music number of the "music" just played back during the REW mode operation. When, for example, the music number of the "music" just played back is No. 7, the first music intermission pulse corresponds to the music number of No. 8 and the second music intermission pulse corresponds to the music number of No. 7. The third music intermission pulse corresponds to the music number of No. 6. The counter 2 should count down the music intermission pulses from the third music intermission pulse. This down-count operation of the counter 2 continues until the contents of the memory 1 and the counter 2 are coincident with each other.

When the content of the counter 2 coincides with that of the memory 1, the comparator 5 produces the third signal on its "B=A" terminal which is inverted by the inverter $G_{23}$ and then applied to the mechanism drive circuit 11 as the PLAY mode indication signal. The third signal is further applied to the clock input terminals of the shift registor 9A and 9B which are both cleared to produce the low level signal on the output terminals 1A through 4A and 1B through 4B. At the same time, the second signal disappears so as to stop the REW mode operation. The third signal is further applied through the differentiator and the diode $D_{56}$ to the inverter $G_9$ so as to reset the flip-flop circuits 6 and 12.

When, with the flip-flop circuit 6 being set, the content of the memory 1 is larger than that of the counter 2, the comparator 5 produces the first signal which is supplied to the gate $G_{21}$, $G_{11}$, and $G_{15}$. When under this condition, the play-back operation for the "music" corresponding to the content of the counter 2 is completed, the detector 8 produces a music intermission pulse which is supplied through the gate $G_{15}$ to the clock input terminal CK of the shift registor 9B. The shift registor 9B then produces the high level signal on its output terminal 1B which is supplied to the gate $G_{22}$. The gate $G_{22}$ then supplies the low level signal to the mechanism drive circuit 12 as the FF mode command signal. The playback apparatus then perform the FF mode operation. The music intermission pulses from the detector 8 are, on the other hand, supplied through the gate $G_{11}$ to the counter 2 as the up-count pulses. When the content of the counter 2 coincides with that of the memory 1, the comparator 5 ceases to produce the first signal and produces the third signal. Accordingly, the gate $G_{11}$ blocks the music intermission pulse train and the gate $G_{22}$ ceases to produce the FF mode command signal. At the same time, the flip-flop circuits 6 and 11 are both reset and the shift registors 9A and 9B are both cleared.

It is now to be understood that the constantly glowing point on the display constituted by photo diodes $D_{37}$ through $D_{46}$ moves toward the intermittently glowing point corresponding to the reserved "music" during the FF or REW mode operation in accordance with the up-count or down-count in the counter 2 thereby to make visible the internal operation of the device.

It is to be noted that even though the third signal from the comparator 5 corresponds to the PLAY mode operation in the above-mentioned example the third signal may correspond to the STOP mode operation, if preferred.

As being apparent from the above description, the music reservation device according to the present invention is so convenient since it can automatically find out and play back a reserved "music". Furthermore, the circuit arrangement of the device can be readily realized in the form of an integrated circuit which is small in size and advantageously used for a small sized and regular tape recorder.

Having described a specific preferred embodiment of the invention with reference to the accompanying drawing, it is to be understood that the invention is not limited to that precise circuit arrangement, and that various changes and modifications may be effected therein by one skilled in the art without departing from the scope spirit of the invention as defined in the appended claims.

What is claimed is:

1. In a control system for controlling a magnetic tape play-back apparatus which is adapted to play back a magnetic tape set therein via a play-back head thereof in response to a play-back command signal and to advance said tape either forwardly or reversely while engaging the head against the tape in response to a forward or reverse command signal, which control system comprises music number signal producing means for producing a music number signal representing a number of one piece of music recorded on the magnetic tape to be played back when manually operated, said music producing means including a plurality of manually operated switches and an encoder for producing a binary code signal corresponding to the position of at least one of said switches, and a music intermission pulse generator for generating a music intermission pulse when the play-back head passes an intermission zone of said magnetic tape, the improvement comprising:

storing means for storing the latest one of said music number signal represented by said binary code from said encoder;

a presettable up-down counter which is pre-set at a count corresponding to one of said music number signals applied thereto as long as it is allowed to be pre-set;

reservation command means for inhibiting the preset operation of said presettable up-down counter when manually actuated said reservation command means including a reservation command switch and a reservation stop switch, a flip-flop circuit which becomes set in response to actuation of said reservation stop switch, a loading pulse generator for generating a loading pulse in response to said binary code signal, a gate for passing said loading pulse therethrough to said up-down counter when the flip-flop circuit is set and said up-down counter being a binary counter adapted to be preset by said binary code signal during the presence of said loading pulse that is passed through said gate;

comparing means for comparing the music number stored in said storing means with the count of said preset-table up-down counter and including means for producing a first signal when the music number is larger than the count, a second signal when the music number is smaller than the count and a third signal when the music number equals the count;

forward advancement control means for producing said forward command signal in response to the initial music intermission pulse during the presence of said first signal and for incrementing said preset-table up-down counter in response to each music intermission pulse until the music number stored in said storing means equals the count of said up-down counter;

reverse advancement control means for producing said rewind command signal in response to the initial music intermission pulse during the presence of said second signal and for decrementing said presettable up-down counter in response to each music intermission pulse except a first two of said pulses until the music number stored in said storing means equals the count of said up-down counter; and stop means responsive to the presence of said third signal to stop the forward or reverse advancement of said magnetic tape set.

2. The improvement device as set forth in claim 1, in which said reservation command means further includes a resetting circuit for resetting said first flip-flop circuit in response to said third signal.

3. A music reservation device as set forth in claim 1, which further comprises display means for displaying at least one music number in response to at least one music number signal applied thereto, a first relay means for intermittently supplying a music number signal corresponding to the stored music number signal in said storing means to said display means during operation of said reservation command means, and second relay means for supplying a music number signal corresponding to the count of said presettable up-down counter to said display means during operation of said reservation command means.

4. A music reservation device as set forth in claim 3, in which said first relay means includes first gate means for passing therethrough output signals from said storing means when it is triggered, a first decoder circuit for decoding the output signals passed through said first gate means, and a pulse generator for supplying trigger pulses to said first gate means during operation of said reservation means, and in which said display means includes a plurality of light emissive elements energized by the decoded signal from said first decoder.

5. A music reservation device as set forth in claim 4, in which said second relay means includes a second gate means for passing therethrough output signals from said presettable up-down counter when triggered, a second decoder circuit for decoding the output signals passed through said second gate means, and a triggering circuit for triggering said second gate means during operation of said reservation indication means, and in which said light emissive elements energized by the decoded signal from said second decoder.

6. The improvement as defined in claim 4, in which said forward advancement control means includes a first shift register connected to said music intermission pulse generator for producing a first trigger signal in response to said initial music intermission pulse, a first gate for passing therethrough said first trigger signal as said forward command signal during the presence of said first signal, and a second gate for passing therethrough said music intermission pulses as said up count pulses during the presence of said first signal.

7. The improvement as defined in claim 5, in which said reverse advancement control means includes a third gate for passing therethrough said first trigger signal as said rewind command signal during the presence of said second signal, a second shift register for producing a second trigger signal in response to the third one of said music intermission pulses, and a fourth gate for passing therethrough said music intermission pulses as said down count pulses in response to said second trigger signal.

* * * * *